(12) United States Patent
Hasuo et al.

(10) Patent No.: US 8,593,699 B2
(45) Date of Patent: Nov. 26, 2013

(54) IMAGE SENSOR MODULE AND IMAGE SENSOR

(75) Inventors: Tomotake Hasuo, Kanagawa (JP); Masayuki Ohki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 189 days.

(21) Appl. No.: 13/153,847

(22) Filed: Jun. 6, 2011

(65) Prior Publication Data
US 2012/0069407 A1 Mar. 22, 2012

(30) Foreign Application Priority Data
Sep. 22, 2010 (JP) ................................. 2010-212355

(51) Int. Cl.
*H04N 1/04* (2006.01)
(52) U.S. Cl.
USPC .......... 358/471; 358/513; 358/514; 348/243; 348/294
(58) Field of Classification Search
USPC ............. 358/474, 482, 483, 471, 513, 514; 348/243, E05.079, 294, E05.091
See application file for complete search history.

(56) References Cited

U.S. PATENT DOCUMENTS

| | | | | |
|---|---|---|---|---|
| 5,592,222 | A * | 1/1997 | Nakamura et al. | 348/294 |
| 5,945,663 | A * | 8/1999 | Bird | 250/208.1 |
| 6,002,287 | A * | 12/1999 | Ueno et al. | 327/307 |
| 6,014,160 | A * | 1/2000 | Tewinkle et al. | 347/247 |
| 6,111,606 | A * | 8/2000 | Ikeda | 348/241 |
| 6,426,776 | B1 * | 7/2002 | Ochi | 348/370 |
| 6,906,332 | B2 * | 6/2005 | Tashiro et al. | 250/370.11 |
| 7,164,506 | B2 * | 1/2007 | TeWinkle | 358/474 |
| 7,164,509 | B2 * | 1/2007 | Machida | 358/482 |
| 8,045,031 | B2 * | 10/2011 | Cieslinski | 348/308 |
| 8,154,637 | B2 * | 4/2012 | Cieslinski | 348/301 |
| 8,196,839 | B2 * | 6/2012 | Wang | 235/472.01 |

FOREIGN PATENT DOCUMENTS

| | | |
|---|---|---|
| JP | 3-243060 | 10/1991 |
| JP | 2005-12752 | 1/2005 |
| JP | 2009-232175 | 10/2009 |
| TW | 384622 | 3/2000 |

OTHER PUBLICATIONS

Japanese Office Action Issued Jan. 29, 2013 in Patent Application No. 2010-212355 (with English translation).
Taiwanese Office Action dated Jul. 24, 2013, issued in Application No. 100107922 (with English translation).

* cited by examiner

*Primary Examiner* — Negussie Worku
(74) *Attorney, Agent, or Firm* — Oblon, Spivak, McClelland, Maier & Neustadt, L.L.P.

(57) ABSTRACT

According to one embodiment, an image sensor module including a plurality of image sensors and a common signal line. The common signal line is commonly electrically connected to the plurality of image sensors. To the common signal line, image signals are output sequentially from the plurality of image sensors. The image sensor module feeds back a feedback signal from a first image sensor to a predetermined image sensor. The first image sensor is an image sensor which lastly outputs the image signal among the plurality of image sensors. The predetermined image sensor is an image sensor which outputs an offset signal to the common signal among the plurality of image sensors. The feedback signal indicates a completion of an output of image signal to the common signal line. The predetermined image sensor outputs the offset signal to the common signal line in response to the feedback signal.

19 Claims, 8 Drawing Sheets

IMAGE SENSOR MODULE AND IMAGE SENSOR

CROSS-REFERENCE TO RELATED APPLICATIONS

This application is based upon and claims the benefit of priority from the prior Japanese Patent Application No. 2010-212355, filed on Sep. 22, 2010; the entire contents of which are incorporated herein by reference.

FIELD

Embodiments described herein relate generally to an image sensor module and an image sensor.

BACKGROUND

Conventionally, as a line image sensor module used for a scanner, a copying machine, or the like, there has been known a line image sensor module which includes a plurality of image sensors outputting image signals in series to a common signal line by using a DC offset as a reference. In the line image sensor module, the output terminals of the respective image sensors for outputting the image signals are commonly connected to the common signal line, and the image signals of the respective image sensors are sequentially output to the common signal line from the head image sensor. The image signals output to the common signal line are sequentially supplied to a signal processing circuit connected to the following stage of the common signal line.

However, the voltage level of the common signal line tends to be attenuated from the level of the DC offset to the ground level, after the completion of the output of the signal from the final image sensor. When the voltage level of the common signal line is attenuated from the level of the DC offset to the ground level, an operation point of the signal processing circuit connected to the following stage of the common signal line tends to be deviated from a signal-processable range. Therefore, there is a concern that the signal processing circuit cannot perform signal processing on the image signal which is received earlier.

DETAILED DESCRIPTION

In general, according to one embodiment, there is provided an image sensor module including a plurality of image sensors and a common signal line. Each of the plurality of image sensors includes a photoelectric conversion unit. The common signal line is commonly electrically connected to the plurality of image sensors. To the common signal line, image signals are output sequentially from the plurality of image sensors. The image sensor module feeds back a feedback signal from a first image sensor to a predetermined image sensor. The first image sensor is an image sensor which lastly outputs the image signal among the plurality of image sensors. The predetermined image sensor is an image sensor which outputs an offset signal to the common signal among the plurality of image sensors. The feedback signal indicates a completion of an output of image signal to the common signal line. The predetermined image sensor outputs the offset signal to the common signal line in response to the feedback signal.

Exemplary embodiments of an image sensor module will be explained below in detail with reference to the accompanying drawings. The present invention is not limited to the following embodiments.

(Embodiment)

Figure 1A:
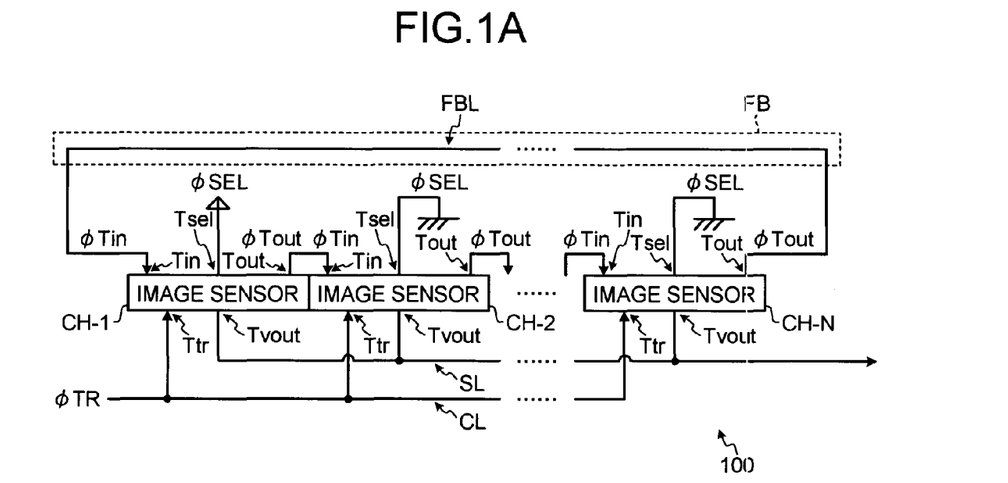
FIGS. 1A and 1B are diagrams illustrating the configuration and operation of an image sensor module according to an embodiment.

The configuration of an image sensor module 100 according to the embodiment will be described with reference to FIG. 1A. FIG. 1A is a diagram illustrating the configuration of the image sensor module 100.

For example, the image sensor module 100 is a line image sensor module or a contact image sensor module used for a scanner, a copying machine, or the like. The image sensor module 100 includes a plurality of image sensors CH-1 to CH-N, a common signal line SL, and a feedback unit FB.

For example, the plurality of image sensors CH-1 to CH-N are arranged in a line shape (one dimensionally) in a main scanning direction, when the image sensor module 100 is the line image sensor module. For example, in an apparatus, such as a scanner or a copying machine, using the image sensor module 100, the image sensor module 100 is moved in a sub-scanning direction perpendicular to the main scanning direction to read a pattern on a scanned object (for example, a paper document).

The plurality of image sensors CH-1 to CH-N have circuit configurations equivalent to each other. For example, the plurality of image sensors CH-1 to CH-N each includes a plurality of photoelectric conversion units (plurality of pixels) 11 (see FIG. 2). Each of the image sensors CH-1 to CH-N sequentially outputs image signal to the common signal line SL according to the charges generated by the respective photoelectric conversion units 11. Hereinafter, description will be made on the assumption that the plurality of image sensors CH-1 to CH-N sequentially outputs the image signals to the common signal lines SL (see FIG. 1A). However, the sequence in which the image signals are output to the common signal line SL is not limited thereto.

The image sensors CH-1 to CH-N each include a control terminal Ttr, a control terminal Tsel, an input terminal (timing signal input terminal) Tin, an output terminal (timing signal output terminal) Tout, and an output terminal Tvout.

The control terminal Ttr is a terminal to which a line synchronization signal ΦTR is supplied from the outside of the image sensor module 100 via a control line CL. The line synchronization signal ΦTR is a signal for synchronization (that is, equalization of a charge accumulation period) between the plurality of image sensors CH-1 to CH-N. As shown in FIG. 1A, the line synchronization signal ΦTR is supplied in parallel (in synchronization) to the control terminals Ttr of the plurality of image sensors CH-1 to CH-N via the control line CL.

The control terminal Tsel is a terminal to which a head sensor identification signal ΦSEL is supplied. The head sensor identification signal ΦSEL is a signal which is used to identify whether the image sensor is the head sensor and which is fixed at a predetermined level. That is, the control terminal Tsel of the image sensor (that is, the head sensor) CH-1 that is prearranged to firstly output the image signal is connected to, for example, a power-source potential so that the head sensor identification signal ΦSEL fixed at an H level is supplied. The control terminal Tsel of each of the other image sensors (that is, the sensors other than the head sensor) CH-2 to CH-N is connected to, for example, a ground potential so that the head sensor identification signal ΦSEL fixed at an L level is supplied.

The input terminal Tin is a terminal to which a timing signal ΦTin is input. The timing signal ΦTin is a signal indicating a timing at which the image signal is output. The input terminal Tin of the image sensor (head sensor) CH-1 that is prearranged to firstly output the image signal is connected to the feedback unit FB. The input terminal Tin of each of the other image sensors (the sensors other than the head sensor) CH-2 to CH-N is connected to the output terminal Tout of the previously adjacent image sensor. For example, the input terminal Tin of the image sensor CH-2 is connected to the output terminal Tout of the image sensor CH-1.

The output terminal Tout is a terminal which outputs a timing signal ΦTout. The timing signal ΦTout is a signal indicating that the output of the image signal is complete. The output terminal Tout of the image sensor (final sensor) CH-N that is prearranged to lastly output the image signal is connected to the feedback unit FB. The output terminal Tout of each of the image sensors (the sensors other than the final sensor) CH-1 to CH-(N−1) is connected to the input terminal Tin of the subsequently adjacent image sensor. For example, the output terminal Tout of the image sensor CH-1 is connected to the input terminal Tin of the image sensor CH-2.

The output terminal Tvout is a terminal which outputs at least "an image signal ΦSig+a DC offset ΦOFS." The output terminals Tvout of the image sensors CH-1 to CH-N are commonly connected to the common signal line SL.

The common signal line SL is commonly connected to the plurality of image sensors CH-1 to CH-N. The image signal ΦSig and the DC offset (offset signal) ΦOFS are sequentially output from the output terminals Tvout of the plurality of image sensors CH-1 to CH-N to the common signal line SL.

The feedback unit FB feeds back the timing signal ΦTout (as the timing signal ΦTin) from the image sensor CH-N that is prearranged to lastly output the image signal to the image sensor CH-1 scheduled to subsequently output the DC offset ΦOFS. The feedback unit FB includes, for example, a feedback line FBL. Among the plurality of image sensors CH-1 to CH-N, the feedback line FBL is connected to the image sensor CH-N that is prearranged to lastly output the image signal and the image sensor CH-1 scheduled to output the DC offset ΦOFS.

Thus, the image sensor CH-1 recognizes that the plurality of image sensors CH-1 to CH-N have completed the output of the image signals at the timing signal ΦTin fed back by the feedback unit FB, and then outputs the DC offset ΦOFS to the common signal line SL.

Figure 1B:
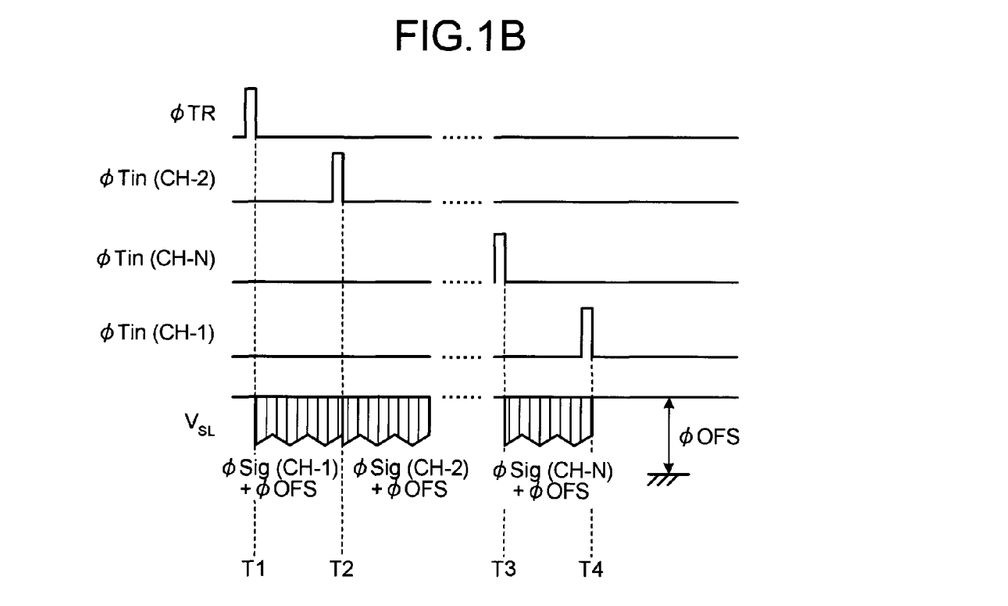

Next, the operation of the image sensor module 100 according to the embodiment will be described with reference to FIG. 1B. FIG. 1B is a waveform diagram illustrating the operation of the image sensor module 100.

At a timing T1, the line synchronization signal ΦTR is supplied to the control terminals Ttr of the image sensors CH-1 to CH-N. The image sensors CH-1 to CH-N complete a charge accumulation operation of the photoelectric conversion units 11 in synchronization with the line synchronization signal ΦTR and hold the charges generated in the photoelectric conversion units 11 in charge holding units. Then, the image sensors CH-1 to CH-N restart the charge accumulation operation of the photoelectric conversion units 11. Moreover, the image sensor CH-1 that is prearranged to firstly output the image signal outputs the image signal ΦSig corresponding to the charges held in the charge holding units together with the DC offset ΦOFS to the common signal line SL in synchronization with the line synchronization signal ΦTR. Thus, the image signal ΦSig is superimposed on the DC offset ΦOFS to form a level $V_{SL}$ of the common signal line SL.

At a timing T2, the timing signal ΦTout output from the output terminal Tout of the image sensor CH-1 is supplied as the timing signal ΦTin to the input terminal Tin of the image sensor CH-2. The image sensor CH-2 outputs the image signal ΦSig corresponding to the charges held in the charge holding units together with the DC offset ΦOFS to the common signal line SL in synchronization with the timing signal ΦTin.

Thereafter, the similar operations are sequentially performed on the image sensors CH-3 to CH-(N−1) (all of which are not shown).

At a timing T3, the timing signal ΦTout output from the image sensor CH-(N−1) is supplied as the timing signal ΦTin to the input terminal Tin of the image sensor CH-N. The image sensor CH-N outputs the image signal ΦSig corresponding to the charges held in the charge holding units together with the DC offset ΦOFS to the common signal line SL in synchronization with the timing signal ΦTin.

At a timing T4, the timing signal ΦTout output from the output terminal Tout of the image sensor CH-N is fed back as the timing signal ΦTin to the input terminal Tin of the image sensor CH-1 by the feedback unit FB. Thus, the image sensor CH-1 recognizes that the plurality of image sensors CH-1 to CH-N have completed the output of the image signals in response to the timing signal ΦTout (ΦTin) fed back by the feedback unit FB, and thus outputs the DC offset ΦOFS to the common signal line SL.

Figure 5:
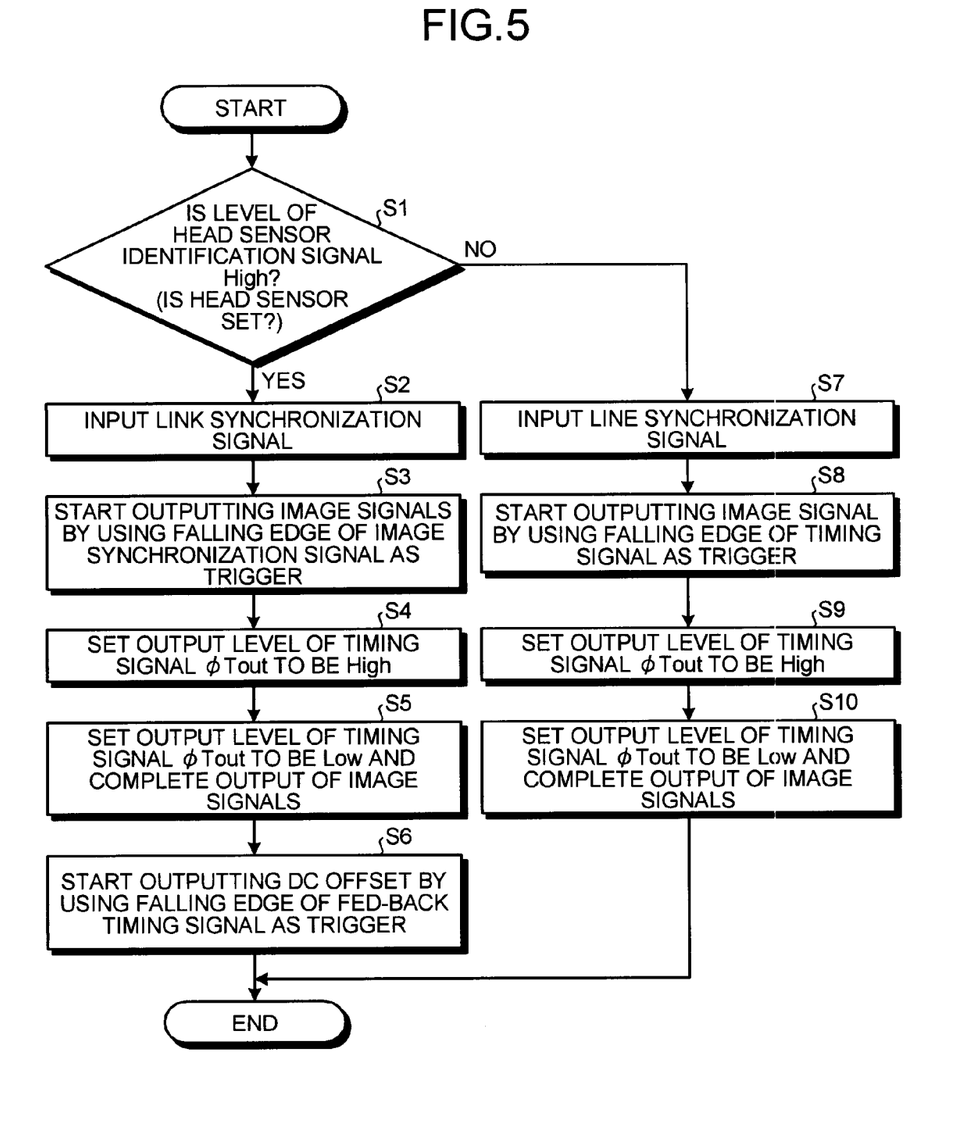
FIG. 5 is a flowchart illustrating the operation of each image sensor according to the embodiment.

Next, the operation of the image sensors CH-1 to CH-N will be described with reference to FIG. 5. FIG. 5 is a flowchart illustrating the operation of the image sensors CH-1 to CH-N.

In step S1, the image sensors CH-1 to CH-N determine whether the level of the head sensor identification signal ΦSEL is the H level. When the image sensors CH-1 to CH-N determine that the level of the head sensor identification signal ΦSEL is the H level, the process proceeds to step S2. On the other hand, when the image sensors CH-1 to CH-N determine that the level of the head sensor identification signal ΦSEL is the L level, the process proceeds to step S7.

For example, in FIG. 1A, since the image sensor CH-1 determines that the level of the head sensor identification signal ΦSEL is the H level, the process proceeds to step S2. On the other hand, since the other image sensors CH-2 to CH-N determine that the level of the head sensor identification signal ΦSEL is the L level, the process proceeds to step S7. Hereinafter, the case shown in FIG. 1A will be described as an example.

In step S2, the line synchronization signal ΦTR is input to the image sensor CH-1.

In step S3, the image sensor CH-1 starts outputting the image signal ΦSig and the DC offset ΦOFS by using a falling edge (at the timing T1 shown in FIG. 1B and part A of FIG. 6) of the line synchronization signal ΦTR as a trigger.

Figure 6:
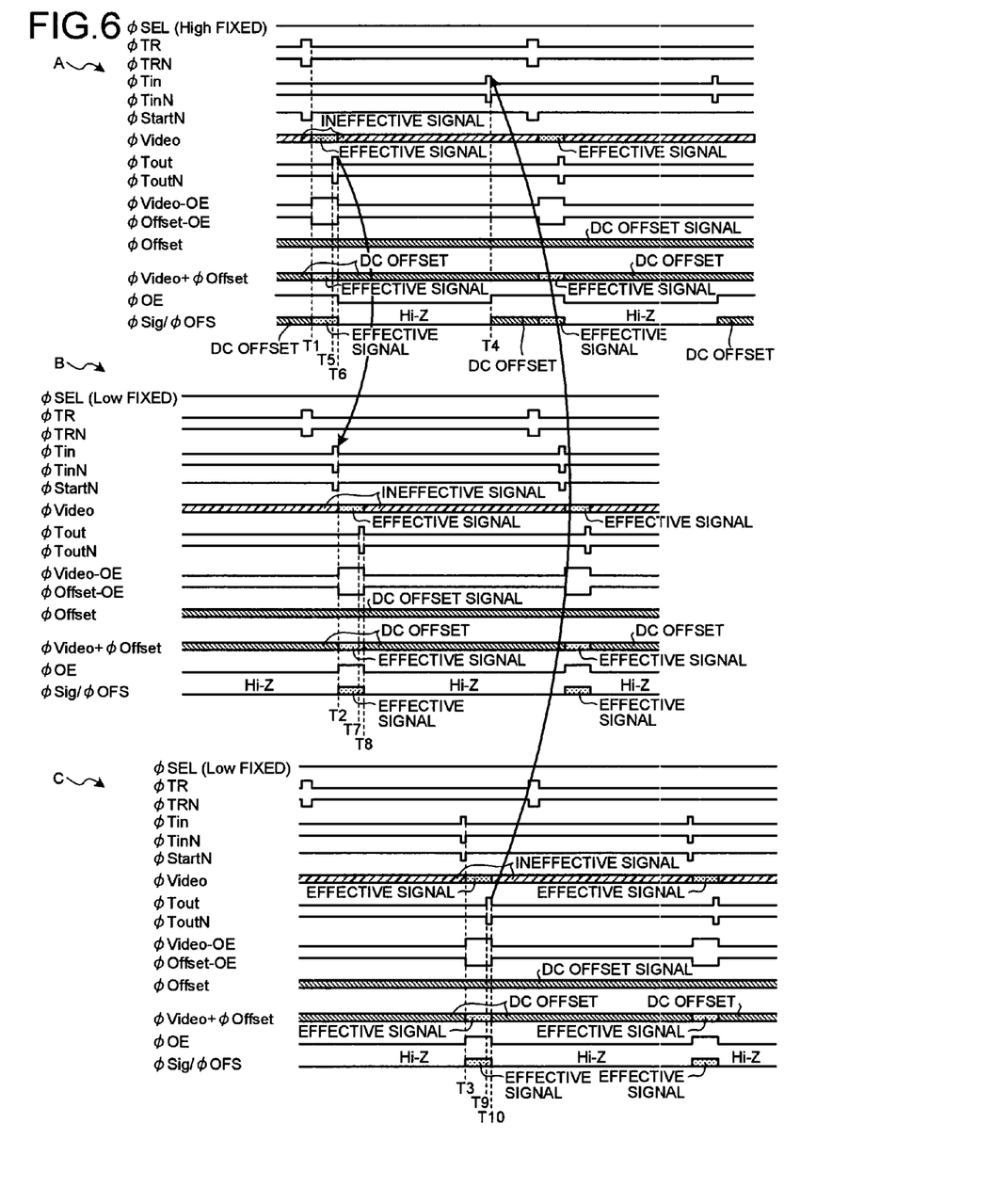
FIG. 6 is a waveform diagram illustrating the operation of the image sensor module according to the embodiment.

In step S4, the image sensor CH-1 sets the level of the timing signal ΦTout output from the output terminal Tout to the H level (at a timing T5 shown in part A of FIG. 6).

In step S5, the image sensor CH-1 sets the level of the timing signal ΦTout output from the output terminal Tout to the L level (at a timing T6 shown in part A of FIG. 6). Simultaneously, the image sensor CH-1 completes the output of the image signal ΦSig+the DC offset ΦOFS.

In step S6, the image sensor CH-1 starts outputting the DC offset ΦOFS by using a falling edge (at a timing T4 shown in FIG. 1B and part A of FIG. 6) of the timing signal ΦTin fed back from the image sensor CH-N by the feedback unit FB.

In step S7, the line synchronization signal ΦTR is input to the image sensors CH-2 to CH-N.

In step S8, the image sensors CH-2 to CH-N start outputting the image signal ΦSig and the DC offset ΦOFS by using a falling edge (at a timing T2 shown in FIG. 1B and part B of FIG. 6 and a timing T3 shown in FIG. 1B and part C of FIG. 6) of the timing signal ΦTin as a trigger.

In step S9, the image sensors CH-2 to CH-N set the level of the timing signal ΦTout output from the output terminal Tout to the H level (at a timing T7 shown in part B of FIG. 6 to a timing T9 shown in part C of FIG. 6).

In step S10, the image sensors CH-2 to CH-N set the level of the timing signal ΦTout output from the output terminal Tout to the L level (at a timing T8 shown in part B of FIG. 6 to a timing T10 shown in part C of FIG. 6). Simultaneously, the image sensors CH-2 to CH-N complete the output of the image signal ΦSig+the DC offset ΦOFS.

Figure 2:
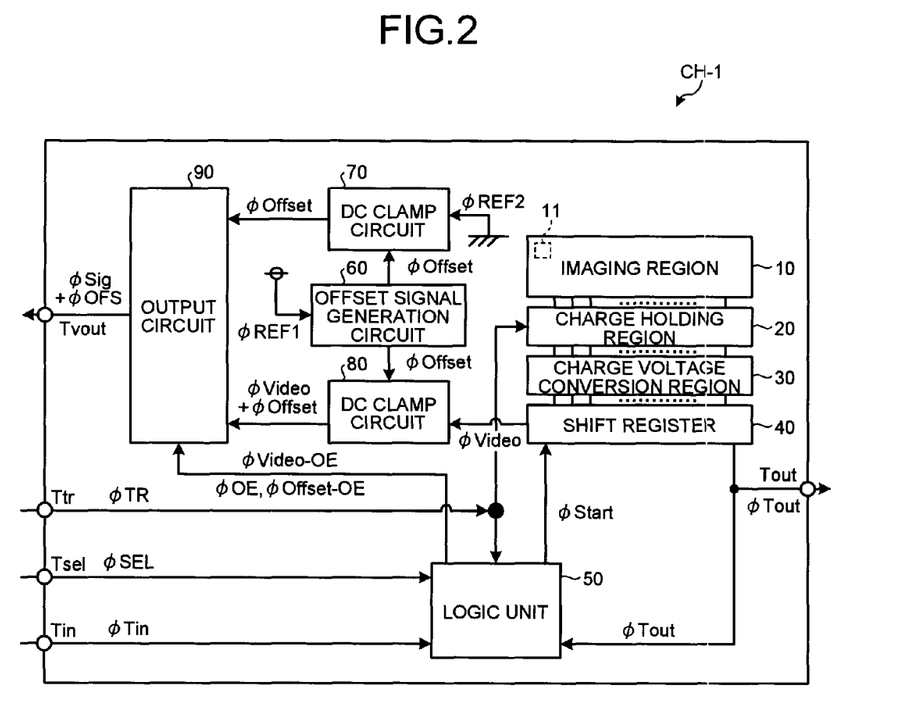
FIG. 2 is a diagram illustrating the configuration of an image sensor according to the embodiment.

Next, the inner configuration of the image sensor CH-1 will be described with reference to FIG. 2. FIG. 2 is a diagram illustrating the inner configuration of the image sensor CH-1. Hereinafter, the inner configuration of the image sensor CH-1 will be described as an example. Since the image sensors CH-1 to CH-N have the circuit configurations equivalent to each other, the inner configurations of the other image sensors CH-2 to CH-N are also the similar to the inner configuration of the image sensor CH-1.

The image sensor CH-1 includes an imaging region 10, a charge holding region 20, a charge voltage conversion region 30, a shift register 40, a logic unit 50, an offset signal generation circuit (generation unit) 60, a DC clamp circuit 70, a DC clamp circuit 80, and an output circuit (output unit) 90.

The imaging region 10 has the plurality of photoelectric conversion units 11 which are arranged in a direction (main scanning direction) along the arrangement direction of the plurality of image sensors CH-1 to CH-N. The photoelectric conversion unit 11 generates and accumulates charges from light. For example, the photoelectric conversion unit 11 is a photodiode.

The charge holding region 20 has a plurality of first transmission units corresponding to the plurality of photoelectric conversion units 11 and a plurality of charge holding units corresponding to the plurality of first transmission unit. Each first transmission unit transmits the charges of the photoelectric conversion unit 11 to the charge holding unit, when receiving the line synchronization signal ΦTR with an active level from the control terminal Ttr. For example, the first transmission unit is a transmission transistor. The first transmission unit transmits the charges of the photoelectric conversion unit 11 to the charge holding unit by being turned on, when its gate receives the line synchronization signal ΦTR with the active level. Each charge holding unit holds the transmitted charges. For example, the charge holding unit is a storage diode.

The charge voltage conversion region 30 has a plurality of second transmission unit corresponding to the plurality of charge holding units, a plurality of charge voltage conversion unit corresponding to the plurality of second transmission units, and a plurality of amplification units corresponding to the plurality of charge voltage conversion units. Each second transmission unit transmits the charges of the charge holding unit to the charge voltage conversion unit, when receiving a horizontal transmission signal with an active level from the shift register 40. For example, the second transmission unit is a transmission transistor. The second transmission unit transmits the charges of the charge holding unit to the charge voltage conversion unit by being turned on when its gate receives the horizontal transmission signal with the active level. Each charge transmission conversion unit converts the transmitted charges into voltage. For example, the charge voltage conversion unit is a floating diffusion. Each amplification unit outputs (horizontally transmits) a signal (signal of the corresponding photoelectric conversion unit (pixel) 11) corresponding to the voltage of the charge voltage conversion unit to the DC clamp circuit 80 via a signal line (not shown). The amplification unit is, for example, an amplification transistor having a gate connected to the charge voltage conversion unit and a source connected to the signal line. The amplification unit outputs a signal corresponding to the voltage of the charge voltage conversion unit and a load of a current source (not shown) connected to the signal line to the DC clamp circuit 80 via the signal line by performing a source follower operation.

The shift register 40 sequentially turns on the plurality of second transmission units (plurality of transmission transistors) so that a signal ΦVideo (signal of the corresponding photoelectric conversion unit (pixel) 11) corresponding to the charges held by the plurality of charge holding units is transmitted to the DC clamp circuit 80 via the charge voltage conversion unit. Specifically, the shift register 40 includes a plurality of registers corresponding to the plurality of second transmission units. In the shift register 40, for example, the register on the initial stage receives a start signal ΦStart described below from the logic unit 50. The shift register 40 supplies a horizontal transmission signal with an active level sequentially to the plurality of second transmission unit by shifting the received start signal ΦStart (or a signal generated in response to the start signal ΦStart) between the plurality of registers. In the shift register 40, for example, the register on the final stage supplies the shifted signal as the timing signal ΦTout to the output terminals Tout and the logic unit 50.

The logic unit 50 receives the line synchronization signal ΦTR, the head sensor identification signal ΦSEL, and the timing signal ΦTin from the control terminals Ttr, the control terminals Tsel, and the input terminals Tin, respectively. The logic unit 50 receives the timing signal ΦTout from the register on the final stage of the shift register 40. The logic unit 50 generates the start signal ΦStart based on the line synchronization signal ΦTR, the head sensor identification signal ΦSEL, and the timing signal ΦTin, and then supplies the start signal ΦStart to, for example, the register on the initial stage of the shift register 40. The logic unit 50 generates output enable signals ΦVideo-OE and ΦOffset-OE based on the start signal ΦStart and the timing signal ΦTout, and then supplies the output enable signals ΦVideo-OE and ΦOffset-OE to the output circuit 90. The logic unit 50 generates an output enable signal ΦOE based on the line synchronization signal ΦTR, the head sensor identification signal ΦSEL, the timing signal ΦTin, and the timing signal ΦTout, and then supplies the output enable signal ΦOE to the output circuit 90.

The offset signal generation circuit 60 receives a predetermined reference signal ΦREF1 (for example, a power-source potential) and generates an offset signal ΦOffset by shifting the level of the received reference signal ΦREF1 by a predetermined level. The offset signal generation circuit 60 supplies the generated offset signal ΦOffset to the DC clamp circuit 70 and the CD clamp circuit 80.

The DC clamp circuit 70 receives a predetermined reference signal ΦREF2 (for example, a ground potential) and receives the offset signal ΦOffset from the offset signal generation circuit 60. The DC clamp circuit 70 clamps the reference signal ΦREF2 and samples a signal obtained by superimposing the offset signal ΦOffset on the reference signal ΦREF2 to perform correlated double sampling (CDS) of obtaining a difference between the clamped signal and the superimposed signal. Thus, the CD clamp circuit 70 outputs a difference signal ΦOffset to the output circuit 90.

The DC clamp circuit 80 sequentially receives the signals ΦVideo of the pixels from the charge voltage conversion region 30 transferred by the shift register 40. The DC clamp circuit 80 receives the offset signal ΦOffset from the offset signal generation circuit 60. The DC clamp circuit 80 clamps a reference portion of the signal of each pixel and samples a data portion using the offset signal ΦOffset as a reference to perform the CDS of obtaining a difference between the reference portion and the data portion. The reference portion is a signal output according to the voltage of the charge voltage conversion unit by the amplification unit in a state where the charge voltage conversion unit is reset. The data portion is a signal output according to the voltage of the charge voltage conversion unit by the amplification unit is a state where the charges (via the charge holding unit) generated in the photoelectric conversion unit 11 is transmitted to the charge voltage conversion unit. Thus, the DC clamp circuit 80 outputs difference signals ΦVideo+ΦOffset, from which a reset noise (fixed pattern noise) is removed, to the output circuit 90.

The output circuit 90 receives the difference signals ΦVideo+ΦOffset of each pixel from the DC clamp circuit 80 and receives the difference signal ΦOffset from the DC clamp circuit 70. The output circuit 90 receives the output enable signals ΦVideo-OE and ΦOffset-OE from the logic unit 50. When receiving the output enable signals ΦVideo-OE and ΦOffset-OE with the active level, the output circuit 90 amplifies the difference signals ΦVideo+ΦOffset or the difference signal ΦOffset and supplies the amplified signal as the image signal ΦSig+the DC offset ΦOFS or a DC offset ΦOFS to the output terminals Tvout.

Figure 3:
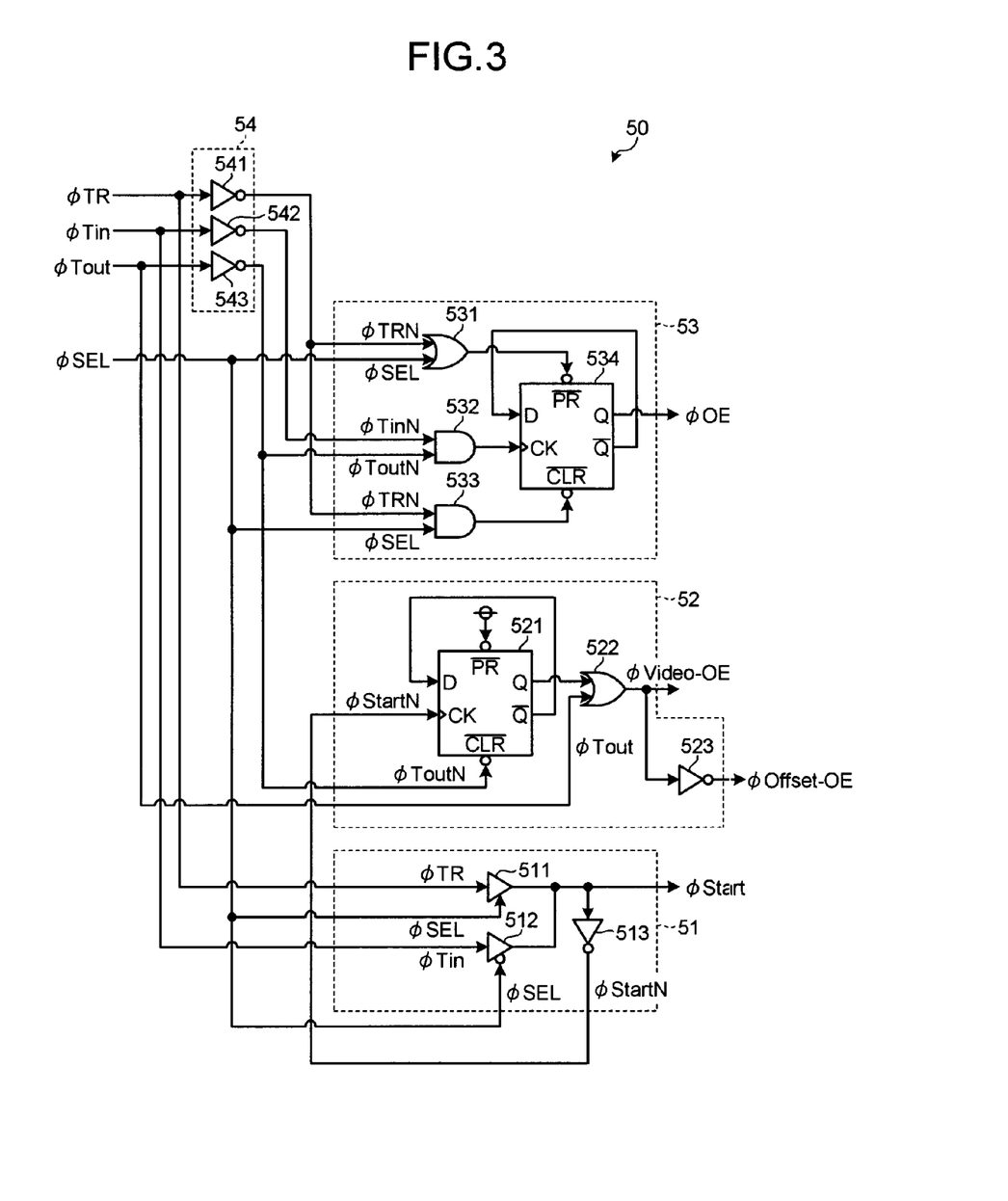
FIG. 3 is a diagram illustrating the configuration of a logic unit according to the embodiment.

Next, an example of the inner configuration of the logic unit 50 will be described with reference to FIG. 3. FIG. 3 is a diagram illustrating the inner configuration of the logic unit 50.

The logic unit 50 includes an inverted signal generation unit 54, a start signal generation unit (selection unit) 51, an enable signal generation unit 52, and an enable signal generation unit 53.

The inverting signal generation unit 54 generates signals ΦTRN, ΦTinN, and ΦToutN logically inverted from the line synchronization signal ΦTR, the timing signal ΦTin, and the timing signal ΦTout, respectively. That is, the inverting signal generation unit 54 includes inverters 541 to 543. The inverter 541 generates the signal ΦTRN logically inverted from the line synchronization signal ΦTR and supplies the signal ΦTRN to the enable signal generation unit 53. The inverter 542 generates the signal ΦTinN logically inverted from the timing signal ΦTin and supplies the signal ΦTinN to the enable signal generation unit 53. The inverter 543 generates the signal ΦToutN logically inverted from the timing signal ΦTout and supplies the signal ΦToutN to the enable signal generation units 52 and 53.

The start signal generation unit 51 generates the start signal ΦStart by the line synchronization signal ΦTR (see part A of FIG. 6) when the image sensor is the head sensor, whereas the start signal generation unit 51 generates the start signal ΦStart by the timing signal ΦTin (see parts B and C of FIG. 6) when the image sensor is not the head sensor. In addition, the start signal generation unit 51 generates a signal ΦStartN logically inverted from the start signal ΦStart.

That is, the start signal generation unit 51 includes amplifiers 511 and 512 and an inverter 513. The amplifier 511 transfers the line synchronization signal ΦTR wizen the level of the head sensor identification signal ΦSEL is the active level (for example, the H level), whereas the amplifier 511 does not transfer the line synchronization signal ΦTR when the level of the head sensor identification signal ΦSEL is a non-active level (for example, the L level). On the other hand, the amplifier 512 does not transfer the timing signal ΦTin when the level of the head sensor identification signal ΦSEL is the active level (for example, the H level), whereas the amplifier 512 transfers the timing signal ΦTin when the level of the head sensor identification signal ΦSEL is a non-active level (for example, the L level). In addition, the start signal generation unit 51 selects the line synchronization signal ΦTR and generates the line synchronization signal ΦTR as the start signal ΦStart when the level of the head sensor identification signal ΦSEL is the active level, whereas the start signal generation unit 51 selects the timing signal ΦTin and generates the timing signal ΦTin as the start signal ΦStart when the level of the head sensor identification signal ΦSEL is a non-active level. The inverter 513 generates the signal ΦStartN logically inverted from the start signal ΦStart and supplies the signal ΦStartN to the enable signal generation unit 52.

The enable signal generation unit 52 generates the output enable signals ΦVideo-OE and ΦOffset-OE so that the output circuit 90 selects the image signal ΦSig+the DC offset ΦOffset during a period in which the shift register 40 starts and ends the shift operation and the output circuit 90 selects the DC offset ΦOFS during other periods (see parts A to C of FIG. 6).

That is, the enable signal generation unit 52 includes a flip flop 521, an OR gate 522, and an inverter 523. In the flip flop 521, a preset terminal PR⁻ is fixed to an H level, the signal ΦStartN is supplied from the start signal generation unit 51 to a clock terminal CK, the signal ΦToutN is supplied from the inverter 543 to a clear terminal CLR⁻, an inverting output terminal Q⁻ is connected to an input terminal D, and an output terminal Q is connected to the OR gate 522. The OR gate 522 generates and outputs the output enable signals ΦVideo-OE by calculating a logical addition of the output Q of the flip flop 521 and the timing signal ΦTout. Thus, the flip flop 521 and the OR gate 522 set the output enable signals ΦVideo-OE to the H level in synchronization with a rising edge of the signal ΦStartN and set the output enable signals ΦVideo-OE to the L level in synchronization with the falling edge of the timing signal ΦTout. The inverter 523 generates a signal logically inverted from the output enable signals ΦVideo-OE as the output enable signal ΦOffset-OE.

The enable signal generation unit 53 generates an output enable signal ΦOE so that the output circuit 90 sequentially outputs the DC offset ΦOFS and the image signal ΦSig+the DC offset ΦOFS during a period in which the timing signal ΦTin is received and the timing signal ΦTout is output, when the image sensor is the head sensor (see part A of FIG. 6). The enable signal generation unit 53 generates the output enable signal ΦOE so that the output circuit 90 sequentially outputs the image signal ΦSig+the DC offset ΦOFS during a period in which the timing signal ΦTin is received and the timing signal ΦTout is output, when the image sensor is not the head sensor (see parts B and C of FIG. 6).

That is, the enable signal generation unit 53 includes an OR gate 531, AND gates 532 and 533, and a flip flop 534. The OR gate 531 calculates logical addition of the signal ΦTRN received from the inverter 541 and the head sensor identification signal ΦSEL and supplies the calculation result to the preset terminal PR⁻ of the flip flop 534. The AND gate 532 calculates logical multiplication of the signal ΦTinN received from the inverter 542 and the signal ΦToutN received from the inverter 543 and supplies the calculation result to the clock terminal CK of the flip flop 534. The AND gate 533 calculates logical multiplication of the signal ΦTRN received from the inverter 541 and the head sensor identification signal ΦSEL and supplies the calculation result to the clear terminal CLR⁻ of the flip flop 534. In the flip flop 534, the inverting output terminal Q⁻ is connected to the input terminal D and the output enable signal ΦOE is output from the output terminal Q. Thus, the flip flop 534 sets the output enable signal ΦOE to the H level in synchronization with the falling edge of the timing signal ΦTin and sets the output enable signal ΦOE to the L level in synchronization with the falling edge of the timing signal ΦTout (see parts A to C of FIG. 6).

Figure 4:
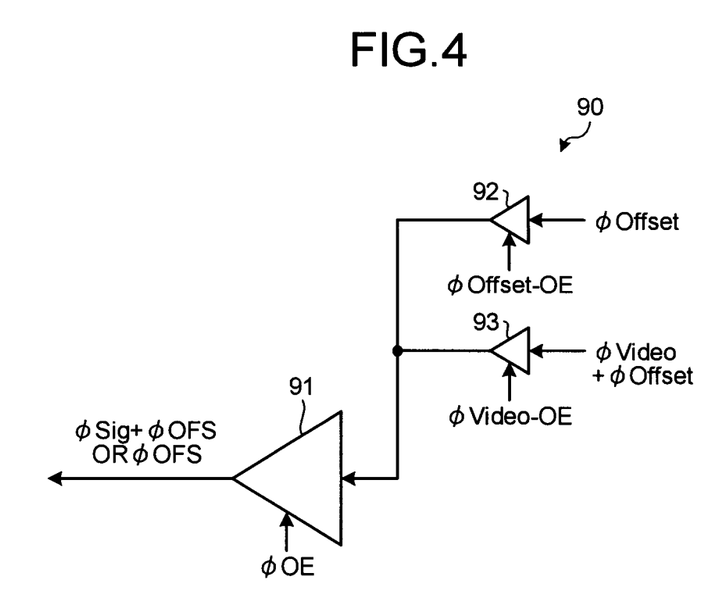
FIG. 4 is a diagram illustrating the configuration of an output circuit according to the embodiment.

Next, an example of the inner configuration of the output circuit 90 will be described with reference to FIG. 4. FIG. 4 is a diagram illustrating the inner configuration of the output circuit 90.

The output circuit 90 outputs the DC offset ΦOFS during a period in which the level of the output enable signal ΦOffset-OE is the active level (for example, the H level) within a period in which the level of the output enable signal ΦOE is the active level (for example, the H level), whereas the output circuit 90 outputs the image signal ΦSig+the DC offset ΦOFS during a period in which the level of the output enable signal ΦVideo-OE is the active level (for example, the H level) when the image sensor is the head sensor (see part A of FIG. 6). The output circuit 90 outputs the image signal ΦSig+ the DC offset ΦOFS during the period in which the level of the output enable signal ΦOE is the active level (for example, the H level) and the period in which the level of the output enable signal ΦVideo-OE is the active level (for example, the H level), when the image sensor is the head sensor (see parts B and C of FIG. 6).

That is, the output circuit 90 includes amplifiers 92 and 93 and an output buffer amplifier 91. The amplifier 92 transfers the difference signal ΦOffset when the level of the output enable signal ΦOffset-OE is the active level (for example, the H level), whereas the amplifier 92 does not transfer the difference signal ΦOffset when the level of the output enable signal ΦOffset-OE is the non-active level (for example, the L level). The amplifier 93 transfers the difference signal ΦVideo when the level of the output enable signal ΦVideo-OE is the active level (for example, the H level), whereas the amplifier 93 does not transfer the difference signal ΦVideo when the level of the output enable signal ΦVideo-OE is the non-active level (for example, the L level). The output buffer amplifier 91 amplifies and outputs the difference signal transferred from the amplifier 92 or 93 when the level of the output enable signal ΦOE is the active level (for example, the H level), whereas the output buffer amplifier 91 does not output the difference signal transferred from the amplifier 92 or 93, that is, sets the output terminal Tvout to Hi-Z (high impedance state) when the level of the output enable signal ΦOE is the non-active level (for example, the L level).

Here, it is supposed that the image sensor module 100 has no feedback unit FB. In this case, since all the plurality of image sensors CH-1 to CH-N may not recognize that the plurality of image sensors CH-1 to CH-N have completed the output of all the image signals, the DC offset ΦOFS may not be output to the common signal line SL. Therefore, a voltage level VSL may sometimes be attenuated from the level of the DC offset ΦOFS to the ground level due to the connection to the common signal line SL, after the final image sensor CH-N completes the output of the image signal among the plurality of image sensors CH-1 to CH-N. When the voltage level VSL of the common signal line SL is attenuated from the level of the DC offset ΦOFS to the ground level, an operation point of a signal processing circuit connected to the following stage of the common signal line SL tends to be deviated from a signal-processable range. Therefore, there is a concern that the signal processing circuit cannot perform signal processing on the image signal which is received earlier.

In the embodiment, however, the image sensor nodule 100 includes the feedback unit FB. The feedback unit FB feeds back the timing signal ΦTout (as the timing signal ΦTin) from the image sensor CH-N that is prearranged to lastly output the image signal to the image sensor CH-1 scheduled to subsequently output the DC offset ΦOFS. Thus, the image sensor CH-1 recognizes that the plurality of image sensors CH-1 to CH-N have completed the output of the image signals in response to the timing signal ΦTin fed back by the feedback unit FB, and thus outputs the DC offset ΦOFS to the common signal line SL. As a consequence, it is possible to maintain the voltage level VSL of the common signal line SL in the vicinity of the level of the DC offset ΦOFS. That is, it is possible to suppress the attenuation of the voltage level of the common signal line SL after the completion of the output of the image signals and the offset signal from the image sensor CH-N that is prearranged to lastly output the image signal to the common signal line SL.

Figure 9A:
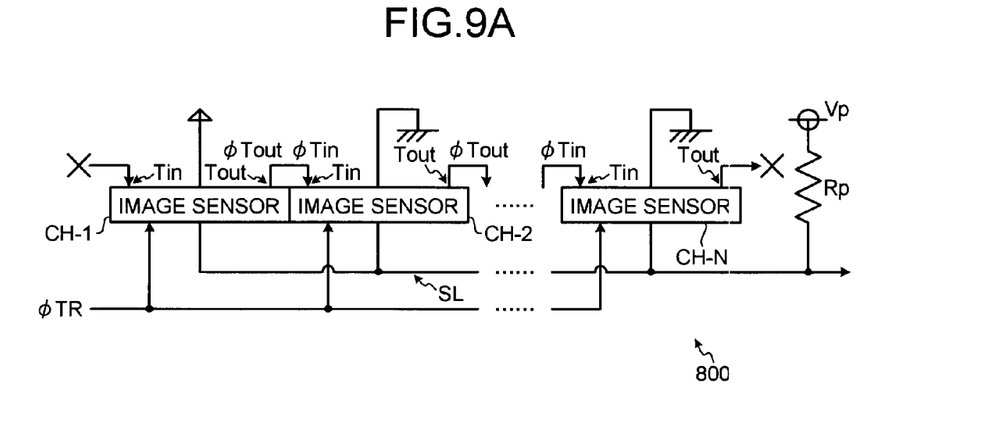
FIGS. 9A and 9B are diagrams illustrating the configuration and operation of an image sensor module according to a comparative example.
Figure 9B:
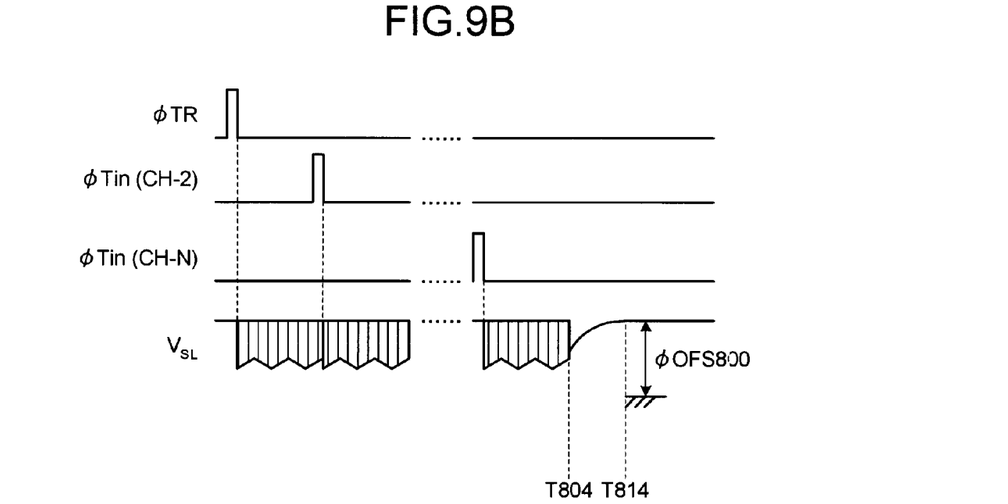

Alternatively, as shown in FIG. 9A, it is supposed that an image sensor module 800 includes no feedback unit FB and the image sensor module 800 includes a DC offset voltage source Vp and a pull-up resistor Rp. In this case, the common signal line SL and the DC offset voltage source Vp are connected to each other via the pull-up resistor Rp. The DC offset voltage source Vp pulls up the voltage level VSL of the common signal line SL via the pull-up resistor Rp up to the DC offset ΦOFS800, after the image sensor CH-N lastly outputting the image signal completes the output of the image signal among the plurality of image sensors CH-1 to CH-N. Thus, as shown in FIG. 9B, it takes quite a long time to stabilize the voltage level from a timing T804 at which the final image sensor CH-N completes the output of the image signal to a timing T814 at which the voltage level VSL of the common signal line SL is stabilized at the DC offset ΦOFS800. Therefore, there is a possibility that the signal processing time becomes long on the whole until the signal processing circuit can process the signals. Moreover, there is a possibility that the sensor output characteristic (linearity) may deteriorate when the pull-up resistor Rp is connected to the common signal line SL.

In the embodiment, however, the image sensor CH-1 outputs the DC offset ΦOFS to the common signal line SL instead of pulling up the voltage level VSL of the common signal line SL using the DC offset voltage source Vp and the pull-up resistor Rp up to the DC offset ΦOFS800. Thus, as shown in FIG. 1B, it is possible to considerably shorten the time in which the voltage level VSL of the common signal line SL is stabilized at the DC offset ΦOFS. Therefore, it is possible to shorten the signal processing time on the whole by the signal processing circuit at the following stage. Moreover, since the pull-up resistor RP is not connected to the common signal line SL, it is possible to prevent the deterioration in the sensor output characteristic (linearity).

In the image sensor module 800 shown in FIG. 9A, the input terminal Tin of the image sensor CH-1 that is prearranged to firstly output the image signal and the input terminal Tout of the image sensor CH-N that is prearranged to lastly output the image signal are not activated and not used.

In the embodiment, however, as shown in FIG. 1A, the image sensor scheduled to output the offset signal is set to the image sensor CH-1 that is prearranged to firstly output the image signal among the plurality of image sensors CH-1 to CH-N. Moreover, the feedback unit FB feeds back the timing signal from the output terminal Tout of the image sensor CH-N that is prearranged to lastly output the image signal to the input terminal Tin of the image sensor CH-1 that is prearranged to firstly output the image signal. Thus, compared to the image sensor module 800 shown in FIG. 9A, it is possible to suppress the attenuation of the voltage level of the common signal line SL after the image sensor CH-N that is prearranged to lastly output the image signal completes the output of the image signal and the offset signal to the common signal line SL, without providing a new terminal to the image sensor. That is, according to the embodiment, it is possible to reduce the manufacturing cost of the image sensor.

In the embodiment, as shown in FIG. 1A, the image sensor module 100 includes the feedback unit FB. The feedback unit FB feeds back the timing signal ΦTout (as the timing signal ΦTin) from the image sensor CH-N that is prearranged to lastly output the image signal to the image sensor CH-1 scheduled to subsequently output the DC offset ΦOFS. Thus, it is not necessary to generate a control signal ΦCTL in the outside of the image sensor module 100 and supply the control signal ΦCTL to the image sensor CH-1 in order to output the DC offset ΦOFS from the initial image sensor CH-1 after the final image sensor CH-N completes the output of the image signal. As a consequence, it is possible to avoid the burden on the development of an external system of the image sensor module.

In the embodiment, the feedback unit FB feeds back the timing signal ΦTout synchronized with the completion of the actual image output (as the timing signal ΦTin) from the image sensor CH-N that is prearranged to lastly output the image signal to the image sensor CH-1 scheduled to subsequently output the DC offset ΦOFS. Thus, as shown in FIG. 1B, the timing at which the DC offset is output from the image sensor CH-1 to the common signal line SL can be set to a timing synchronized with the completion of the actual image output. As a consequence, since the voltage level VSL of the common signal line SL can be stabilized, it is easy to transfer the appropriate image signals.

In the embodiment, the plurality of image sensors CH-1 to CH-N have the terminal configurations and the circuit configurations equivalent to each other, as shown in FIG. 1A. Thus, the common design data and manufacturing process can be applied when the plurality of image sensors CH-1 to CH-N are manufactured. Therefore, it is possible to reduce the manufacturing cost of the image sensor module 100 on the whole.

According to the embodiment, in the image sensor CH-1 scheduled to output the DC offset ΦOFS, the offset signal generation circuit 60 generates the offset signal ΦOffset and supplies the offset signal ΦOffset to the output circuit 90 via the DC clamp circuit 70, as shown in FIG. 2. In addition, the output circuit 90 amplifies the offset signal ΦOffset and outputs the offset signal ΦOffset as the DC offset ΦOFS to the common signal line SL in synchronization with the timing signal ΦTin fed back from the image sensor CH-N that is prearranged to lastly output the image signal by the feedback unit FB. Thus, as shown in FIG. 1B, the DC offset ΦOFS can be set to be output to the common signal line SL in synchronization with the timing T4 at which the final image sensor CH-N completes the output of the image signal.

According to the embodiment, in the image sensor CH-1 scheduled to output the DC offset ΦOFS, the enable signal generation unit 53 generates the output enable signal NE by using the signal ΦTinN logically inverted from the timing signal ΦTin, which is received from the image sensor CH-N that is prearranged to lastly output the image signal, as a clock, as shown in FIG. 3. Thus, the output enable signal ΦOE with the active level maintainable for a given time can be generated in synchronization with the timing signal ΦTin received from the image sensor CH-N and can be supplied to the output circuit 90. As shown in part A of FIG. 6, the output circuit 90 outputs the DC offset ΦOFS to the common signal line SL during the first half of the period in which the level of the output enable signal ΦOE is the active level. Thus, as described above, the DC offset ΦOFS can be output from the output circuit 90 to the common signal line SL in synchronization with the timing T4 at which the final image sensor CH-N completes the output of the image signal.

It should be noted that one photoelectric conversion unit 11 may be disposed in the imaging region 10 of each image sensor CH-1 to CH-N.

It is possible to change the image reading width on a scanned object (for example, a paper document) by changing the number of image sensors CH-1 to CH-N arranged (connected) in the line shape in the main scanning direction in the image sensor module 100.

Figure 7:
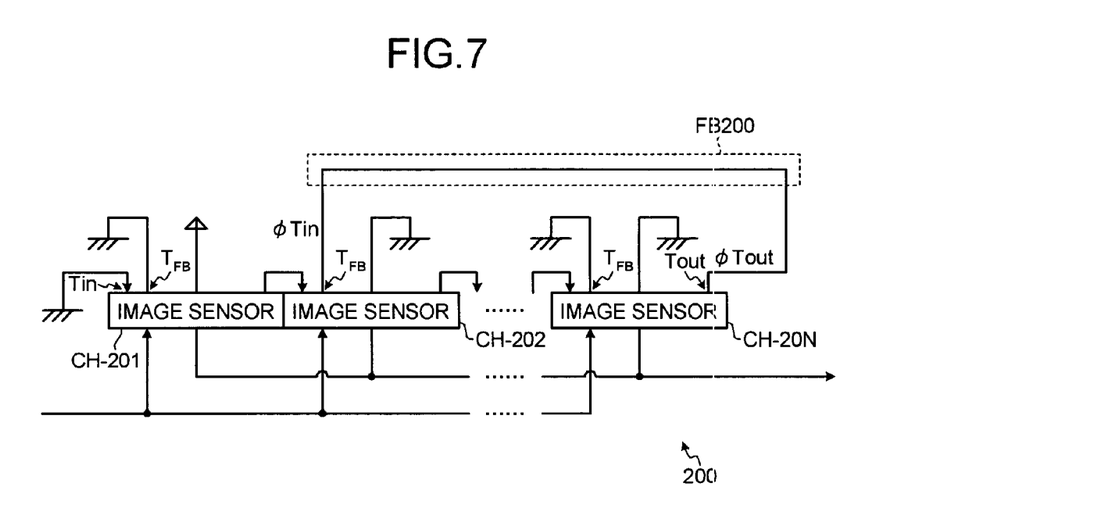
FIG. 7 is a diagram illustrating the configuration of an image sensor module according to a modified example of the embodiment.

As shown in FIG. 7, a feedback unit FB200 of an image sensor module 200 may feed back the timing signal ΦTout of the final image sensor CH-20N to an image sensor other than the initial image sensor CH-201, for example, an image sensor CH-202 (as the image sensor scheduled to subsequently output the offset signal). In this case, the plurality of image sensors CH-201 to CH-20N each further includes an input terminal $T_{FB}$ to receive the fed back timing signal. The timing signal ΦTout fed back by the feedback unit FB200 is input as the timing signal ΦTin from the output terminal Tout of the final image sensor CH-20N to the input terminal $T_{FB}$ of the image sensor CH-202 scheduled to output the offset signal among the plurality of image sensors CH-201 to CH-20N. The input terminals $T_{FB}$ of the other image sensors CH-201 and CH-203 (not shown) to CH-20N are connected to, for example, the ground potential so as not to be activated.

Figure 8:
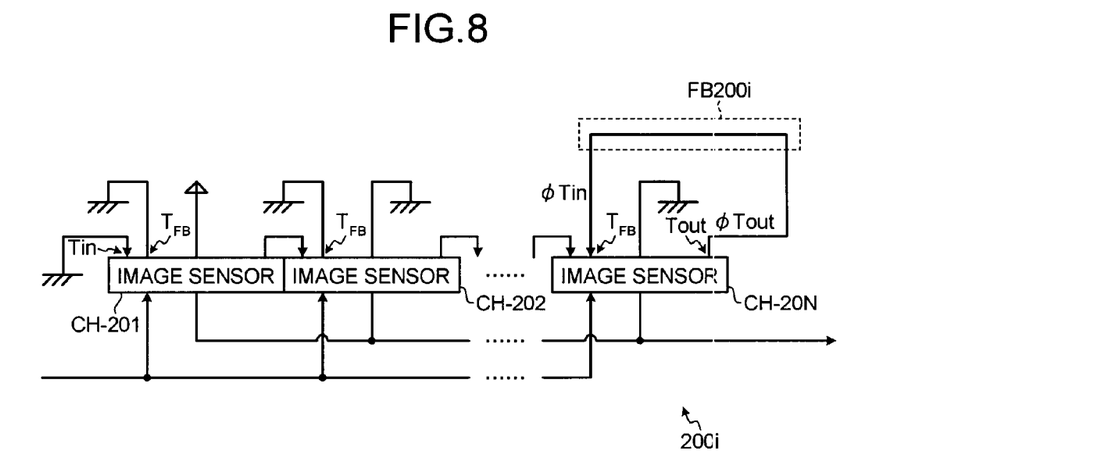
FIG. 8 is a diagram illustrating the configuration of an image sensor module according to another modified example of the embodiment.

Alternatively, as shown in FIG. 8, a feedback unit FB200i of an image sensor module 200i may feed back the timing signal ΦTout of the final image sensor CH-20N to the image sensor CH-20N itself (as the image sensor scheduled to subsequently output the offset signal). In this case, the plurality of image sensors CH-201 to CH-20N each further includes the input terminal $T_{FB}$ to receive the fed back timing signal. The timing signal ΦTout fed back by the feedback unit FB200i is input as the timing signal ΦTin from the output terminal Tout of the final image sensor CH-20N to the input terminal $T_{FB}$ of the image sensor CH-20N scheduled to output the offset signal among the plurality of image sensors CH-201 to CH-20N. The input terminals $T_{FB}$ of the other image sensors CH-201 to CH-20(N−1) (not shown) are connected to, for example, the ground potential so as not to be activated.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image sensor module comprising:
a plurality of image sensors, each including a photoelectric conversion unit;
a common signal line which is commonly electrically connected to the plurality of image sensors and to which image signals are output sequentially from the plurality of image sensors; and
a feedback unit which feeds back a feedback signal from a first image sensor which lastly outputs the image signal among the plurality of image sensors to a predetermined image sensor which outputs an offset signal to the common signal line among the plurality of image sensors, the feedback signal indicating a completion of outputs of image signals from the plurality of image sensors to the common signal line, and
wherein the predetermined image sensor outputs the offset signal to the common signal line in response to the feedback signal.

2. The image sensor module according to claim 1,
wherein the feedback unit includes a feedback line which is electrically connected to the first image sensor and to the predetermined image sensor.

3. The image sensor module according to claim 1,
wherein the predetermined image sensor is a second image sensor which firstly outputs the image signal among the plurality of image sensors.

4. The image sensor module according to claim 3,
wherein, among the plurality of image sensors, the second image sensor outputs the image signal in response to a synchronization signal, and the other image sensors sequentially output image signals to the common signal line in response to a timing signal, the timing signal being transferred from a third image sensor which has output the image signal to a fourth image sensor which subsequently outputs the image signal.

5. The image sensor module according to claim 4,
wherein the second image sensor outputs the offset signal to the common signal line in response to the feedback signal during a first period and outputs the image signal to the common signal line in response to the synchronization signal during a second period subsequent to the first period.

6. The image sensor module according to claim 4,
wherein each of the plurality of image sensors includes a timing signal input terminal and a timing signal output terminal, and
wherein the image sensor module feeds back the feedback signal from the timing signal output terminal of the first image sensor to the timing signal input terminal of the second image sensor.

7. The image sensor module according to claim 6,
wherein each of the plurality of image sensors further includes a control terminal to be supplied with an identification signal used to identify whether an image sensor is the second image sensor or not.

8. The image sensor module according to claim 6,
wherein the timing signal output terminal of the third image sensor is electrically connected to the timing signal input terminal of the fourth image sensor.

9. The image sensor module according to claim 8,
wherein, among the plurality of image sensors, the identification signal with an active level is supplied to the control terminal of the second image sensor, and the identification signal with a non-active level is supplied to the control terminals of the other image sensors,
wherein the second image sensor outputs the image signal in response to the identification signal with the active level and the synchronization signal, and
wherein each of the other image sensors outputs the image signal in response to the identification signal with the non-active level and the timing signal.

10. The image sensor module according to claim 1,
wherein the predetermined image sensor is a fifth image sensor which is other than the first image sensor and a second image sensor which firstly outputs the image signal among the plurality of image sensors.

11. The image sensor module according to claim 10,
wherein each of the plurality of image sensors further includes a timing signal output terminal and a feedback signal input terminal, and
wherein the image sensor module feeds back the feedback signal from the timing signal output terminal of the first image sensor to the feedback signal input terminal of the fifth image sensor.

12. The image sensor module according to claim 11,
wherein in the plurality of image sensors, the timing signal output terminal of the first image sensor is electrically connected to the feedback signal input terminal of the fifth image sensor, and
wherein the feedback signal input terminals of other image sensors except the fifth image sensor are supplied with non-active level signals.

13. The image sensor module according to claim 1,
wherein the predetermined image sensor is the first image sensor.

14. The image sensor module according to claim 13,
wherein each of the plurality of image sensors further includes a timing signal output terminal and a feedback signal input terminal, and
wherein the image sensor module feeds back the feedback signal from the timing signal output terminal of the first image sensor to the feedback signal input terminal of the first image sensor.

15. The image sensor module according to claim 14,
wherein in the plurality of image sensors, the timing signal output terminal and the feedback signal input terminal of the first image sensor are electrically connected to each other, and
wherein the feedback signal input terminals of other image sensors except the first image sensor are supplied with non-active level signals.

16. The image sensor module according to claim 1,
wherein the plurality of image sensors have circuit configurations equivalent to each other.

17. The image sensor module according to claim 16,
wherein each of the plurality of image sensors includes:
a plurality of the photoelectric conversion units;
a selection unit which selects a synchronization signal as a start signal when a level of an identification signal which identifies an image sensor to firstly output the image signal is an active level, and which selects a timing signal as the start signal from a timing signal input terminal when a level of the identification signal is a non-active level;

a clamp unit which superimposes the offset signal on a transmitted signal from the photoelectric conversion unit to generate a superimposed signal;

a shift register which sequentially transmits image signals corresponding to charges generated in the plurality of photoelectric conversion units to the clamp unit by shifting the start signal selected by the selection unit; and an output unit which outputs the signal generated by the clamp unit to the common signal line, wherein the shift register outputs the timing signal to a timing signal output terminal.

18. The image sensor module according to claim 16, wherein each of the plurality of image sensors includes:

a generation unit which generates the offset signal;

an output unit which outputs the offset signal generated by the generation unit to the common signal line; and a control unit which controls the output unit so that the output unit outputs the offset signal to the common signal line in synchronization with the feedback signal when a level of an identification signal is an active level, and the output unit does not output the offset signal to the common signal line when a level of the identification signal is a non-active level, the identification signal being a signal which identifies whether an image sensor is the image sensor to firstly output the image signal or not.

19. The image sensor module according to claim 1, wherein the image sensor includes:

a generation unit which generates the offset signal; and an output unit which outputs the offset signal generated by the generation unit to the common signal line in synchronization with the feedback signal.

\* \* \* \* \*